May 16, 1961

H. R. LOOS 2,984,098

DEVICES FOR NON-DESTRUCTIVE ULTRASONIC
TESTING OF MATERIAL

Filed June 4, 1956

3 Sheets-Sheet 1

INVENTOR.
Horst Rudolf Loos
BY

INVENTOR.
Horst Rudolf Loos
BY

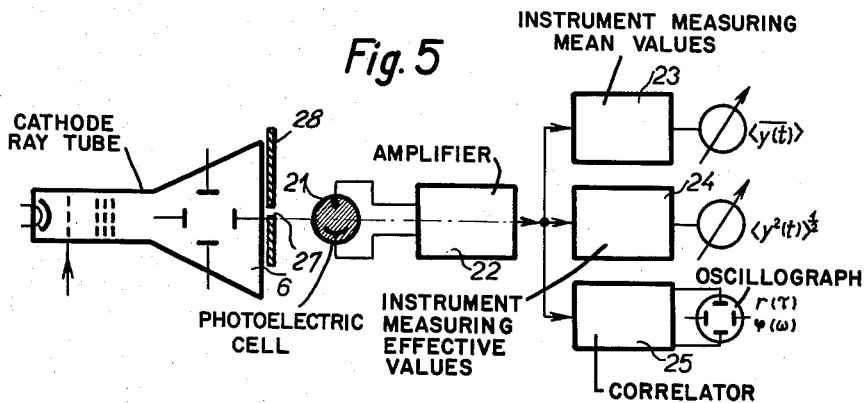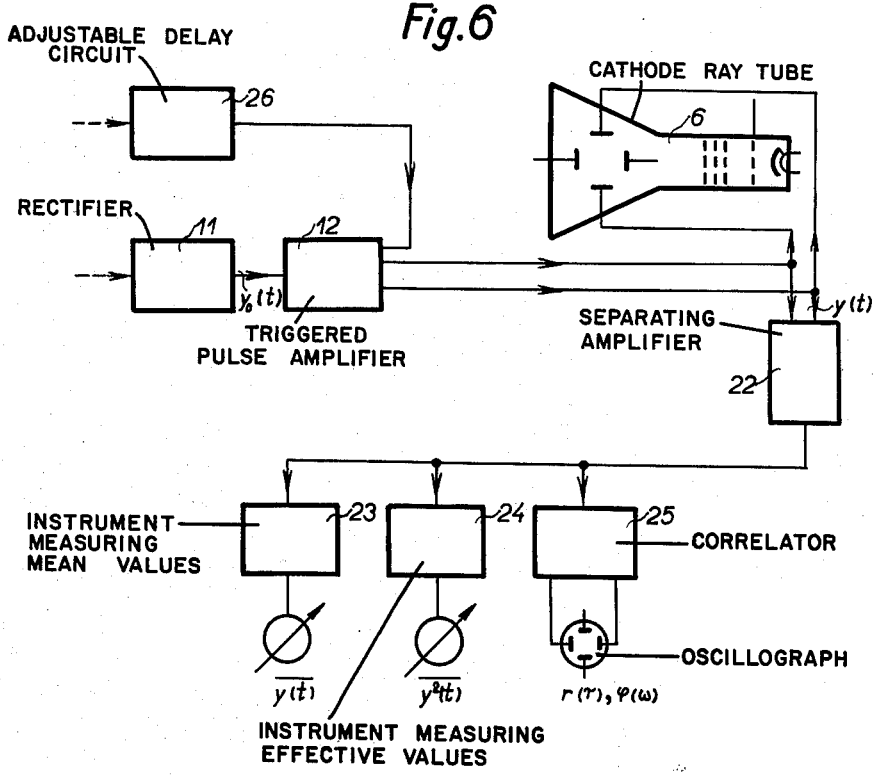

United States Patent Office 2,984,098
Patented May 16, 1961

2,984,098

DEVICES FOR NON-DESTRUCTIVE ULTRASONIC TESTING OF MATERIAL

Horst Rudolf Loos, Nebusice, near Prague, Czechoslovakia, assignor to Statni vyzkumny ustav tepelne techniky Praha, Prague, Czechoslovakia Filed June 4, 1956, Ser. No. 589,099

4 Claims. (Cl. 73—67.9)

The present invention relates to a device for non-destructive ultrasonic testing of material.

Non-destructive ultrasonic testing of material is usually carried out by emitting an ultrasonic signal into the object under test, the characteristic changes of the ultrasonic signal in the course of its passage through the material serving then for ascertaining possible defective spots in the material.

To this end a number of continuous, reflex, resonance or visual methods have been developed and described in publications, such methods being currently used; and measuring instruments, suitable for various particular applications, and employing the known methods, have also been designed.

The accompanying drawings show by way of example on one hand, a typical embodiment of a currently used ultrasonic reflex device for testing of material and, on the other hand, examples of embodiments of the present invention.

Figure 1:
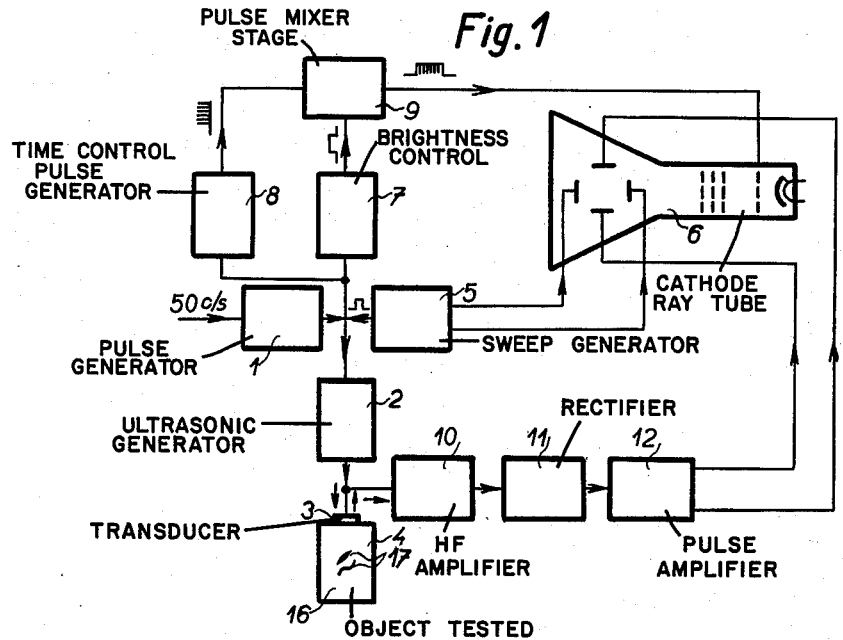
Figure 2:
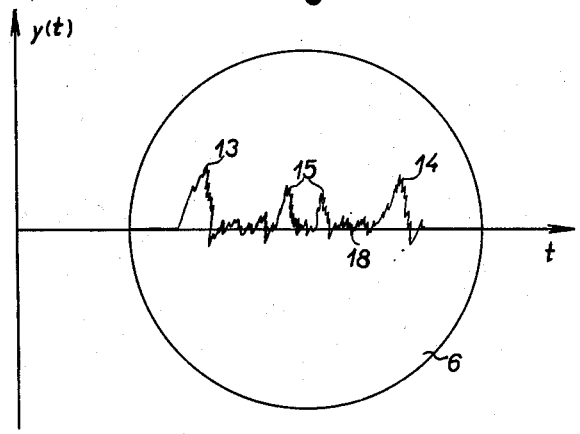
Figure 3:
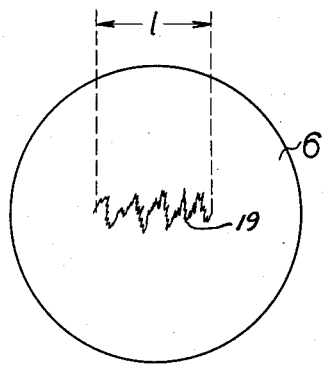
Figure 4:
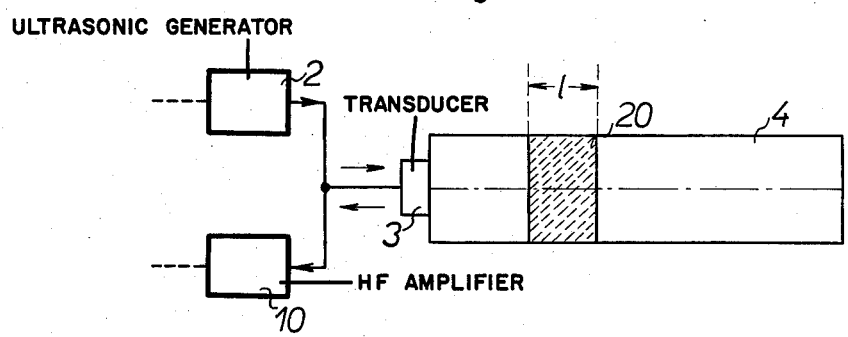
Figure 7:
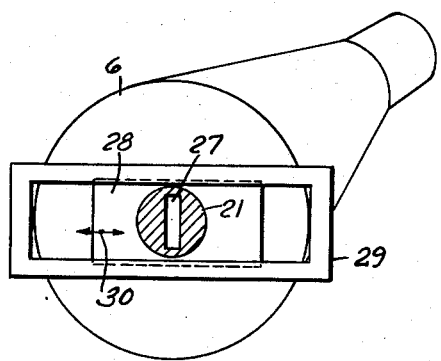

Fig. 1 is a diagrammatic view illustrating a known ultrasonic reflex device for the testing of materials, Fig. 2 shows the indication obtained with the device of Fig. 1, Fig. 3 is a diagrammatic representation of the evaluation of clutter according to the present invention, Fig. 4 is a diagrammatic view of part of the apparatus used in accordance with the invention to obtain the indication represented in Fig. 3, Fig. 5 shows a diagrammatic representation of an apparatus for carrying out the invention, Fig. 6 shows an alternative embodiment thereof, and Fig. 7 is a perspective view of a device for permitting the studying or analysis of a narrow band of an oscillogram.

In the known testing device illustrated in Fig. 1, a pulse generator 1, synchronised by the line frequency, produces rectangular control pulses keying a transmitter 2. The transmitter energises a piezoelectric crystal 3, which radiates high frequency oscillations for a very short period or pulse against the object 4 under test.

The control pulse triggers at the same time a sweep generator 5, which deflects the electronic beam of a cathode ray tube 6 in the direction of the axis $t$ (Fig. 2), representing the horizontal time deflection.

In order to obtain an easily readable oscillogram, the electronic beam is illuminated only during deflection. This is achieved by a device 7, controlling automatically the time of illumination of the trace, the device 7 being also controlled by the control pulse from the generator 1. This control pulse further synchronises a generator of time markers 8, said time signals or markers representing substantially a sequence of sharp pulses darkening the beam trace for a very short instant. The time signals are mixed with the illuminating pulse in a stage 9, wherefrom they are led to the grid of the cathode ray tube 6.

The pulses returning from the sample 4 under test are received by a crystal 3 and amplified in a high frequency wide-range amplifier 10. In a further stage 11 the return pulses are rectified and directed over a low frequency wide-range amplifier 12 to deflection plates of the cathode ray tube 6 for deflection in the vertical direction i.e. the direction of the axis $y(t)$.

Fig. 2 shows an example of an oscillogram obtained with such a known device. Here the direction $t$ represents the horizontal axis, i.e. the time base and the direction $y(t)$ the vertical axis i.e. the intensity of the recorded ultrasonic signal. In this case there appear on the oscillogram, in addition to the emitted pulse 13 and the reflected pulse 14, two additional pulses 15 of a lower intensity, which are produced by the reflection on the defective spots 17 of the body 4 under test (Fig. 1).

From the shape, location and size of such pulses 15 the quality of the tested material may be judged.

A substantial disadvantage of the known testing device illustrated in Fig. 1 is, of course, the fact, that it is suitable for ascertaining only the so called coarse structural defects of the material, such as cavities, hard kernels, and the like. It has not been possible heretofore to also ascertain by this known ultrasonic device the so called fine structural defects of the material, for example the homogeneity of its crystallic composition and the like. When ascertaining the fine structure or homogeneity of the material, it has up to now been necessary to perform destructive tests i.e. to take a sample, to grind its surface, to etch and to perform macro- or microscopic tests and the like.

The object of the present invention is to provide an apparatus for ultrasonic non-destructive testing of material which, contrary to the hitherto known devices makes it possible to ascertain even the character of the material.

The invention is based on the fact that when employing ultrasonic testing devices of the known type, for example according to Fig. 1, a certain phenomenon 18 may often be observed on the oscillogram (Fig. 2); this phenomenon, by analogy to the radar technique, may be called a clutter. It is produced in particular when the wave length of the ultrasonic pulse approaches the size of crystals of the mtaerial and is caused by reflections from the individual crystals. This clutter can, under certain circumstances, be so strong as to cover the reflection pulses of the defects of the usual material and to render the test unsuitable. In the hitherto known devices the clutter is for this reason suppressed by using the lowest possible frequency and by narrowing the frequency range of the receiver (by suitable selection of the elements 10, 11, 12, Fig. 1).

The gist of the invention resides in the use of what has up to now been considered an undesirable phenomenon to test the so called fine structure of material and to examine its homogeneity.

The apparatus according to the invention permits ultrasonic testing for defects to be extended so as to ascertain ranges of variations in the fine structure in cast or forged components of machines and probably also for checking concrete building elements.

A further feature of the invention resides in that exact data concerning the structure of material may be obtained by means of the quantitative analysis of the clutter, i.e. by a statistical evaluation of characteristics of the indicated signal.

The principle on which the device according to the invention is based may be clarified in greater detail as follows:

The material of the sample under test is built up of individual crystals which in accordance with the type of material have a definite mean size, kind and shape. If the wavelength of the ultrasonic pulse signals in the material is chosen so as to approach the dimensions of the crystals, the energy reflected by the individual crystals will increase in relation to the energy of the primary pulse. All these reflected pulses unite to set up an irregular phenomenon, which can be identified as a clutter. The course of this phenomenon depends on the shape of the emitted pulse and on the distribution, size, kind and shape of the individual crystals. An analogous phenomenon has been described in the radar technique. It is known for example that in radar devices, operating with wavelengths of the order of decimetres, water drops, ice particles or snow flakes in the atmosphere may be ascertained. Each particle causes a reflection of the emitted signal and the sum of all such reflections creates a clutter, indicating a cloud, rainy region or the like (so called rain clutter).

From the above it may be deduced, that the clutter offers information about the state of structure of the material under test. In order to attain the greatest possible prominence of the clutter, it is necessary to assure that the carrying frequency reaches a value at which the wavelength of the ultrasonic waves in the material approaches the dimensions of the crystals (for example for steel greater than 20 mc./sec.) and that the duration of the pulse is short (within the range of 1 μsec. or less). When applying the method according to the invention the transmitter 2, the crystal 3 and the receiver consisting of the elements 10, 11, 12 in the known device (e.g. according to Fig. 1) have to be selected to obtain the above operating conditions.

Examples of carrying out the invention are represented in Figs. 3 to 6, in which corresponding elements are indicated by the same reference numerals.

The device for evaluating the clutter is shown in Figs. 4 and 5. From the total oscillogram (Fig. 2) a definite section 19 is taken out, as shown in Fig. 3, corresponding to the zone 20 of the object 4 under test, in which the quality of the fine structure of the material is to be ascertained.

Any desired section from the oscillogram may be isolated either mechanically (for example by an adjustable slit) or electrically by means of a synhcronised pulse which illuminates the trace of the electron beam in the cathode ray tube 6 in only a predetermined section of the oscillogram.

For this section 19 statistical values, required for evaluating the quality of the structure, are ascertained according to the invention. Such values represent Mean value—
$$<y(t)> \tag{1}$$
effective value—
$$<y^2(t)>^{1/2} \tag{2}$$
correlation function—
$$r(\tau) = \lim_{T \to \infty} \frac{1}{2T} \int_{-T}^{+T} y(t) \cdot y(t+\tau) dt \tag{3a}$$
or if required
Output power frequency spectrum—
$$\varphi(\omega) = \frac{1}{2\pi} \int_{-\infty}^{+\infty} r(\tau) \cdot \cos(\omega\tau) d\tau \tag{3b}$$

The terms "mean value" and "effective value" are explained in detail in Mathematical Methods of Statistics by Hatold Cramer, Princeton University Press—1956, at pages 166 to 192, while the term "correlation function" is described in detail at pages 265 to 290 of the same publication. Further, the term "output power frequency spectrum" is defined and explained at pages 1165 to 1171 of the Proceedings of I.R.E.—1950.

The Formulae 3a and 3b are linked up by the Chinchin-Wiener theorem and give therefore the same information about a given stochastic or random signal.

It is known from the above mentioned literature on mathematical statistics and from other papers, for example: H. R. Loos "A Contribution to the Theory of Linear Circuits for Filtering Signals From Background Noise" (Shornik VUTT, SNTL, Prague 1957, p. 51— in German) that it is possible to represent a stochastic or random course of a process, at least in approximation, by a simple mathematical model.

According to the views developed in the above paper, the process may be represented by the superpositioning of statistically distributed elemental pulses, the amplitude of the pulses being dependent on the structure of the material and on the length of the path traversed in the material. The shape of the pulses is determined by the shape of the emitted pulse.

Because of the absorption of the signal in the material, the amplitude of the elemental pulses decreases with the distance from the point of origin. In order to eliminate this influence on the amplitude, the ratio of mean value and effective value is observed. If the structure is uniform over the entire length of the object tested, it will be understood that the ratio of mean value to effective value will remain constant in oscillograms representative of successive longitudinal sections, as in Fig. 2. It may be assumed that this ratio will be different for sections in which the structure deviates from the normal condition.

An additional independent means of evaluation is furnished by analysis of correlation. The correlation function of the process is determined section by section. The shape of the curve representing this function must be the same for sections having the same structure. It can again be assumed that the shape of the curve representing the correlation function will be different for sections having abnormal structure.

Two independent parameters are thus available for evaluation. The device embodying the invention contains elements for determining both the mean and effective values, and for representing the correlation function. The reason for such an arrangement is found in the fact that simultaneous use of both criteria, that is, observation of the variation of the ratio of the mean and effective values and of the shape of the correlation function, permits better evaluation of the structural variations than the observation of only one of the two characteristic parameters.

Fig. 5 shows diagrammatically a device for evaluating the clutter according to the invention. The oscillogram on the screen of the cathode ray tube 6 of a known defect indicating device (e.g. according to Fig. 1) suitably adjusted in order to achieve the greatest possible clutter is received by means of a photoelectric cell 21. The signals $y(t)$ thus obtained are fed either directly or over an amplifier 22 into an evaluation device which consists of:

(1) An apparatus 23, for example, a conventional electrical coil meter (according to the principles of Depréz d'Arsonval, indicating the mean value $<y(t)>$ (2) An apparatus 24, for example, a conventional electric heating wire meter or an electrodynamic measuring instrument, showing the effective value $<y^2(t)>^{1/2}$ (3) An apparatus 25 for example, an electronic correlator as shown in Fig. 6 on page 1168 of the Proceedings of the I.R.E., 1950, or a wave analyser, such as, Type 736–A as shown at pages 166–167 of Catalog K, General Radio Co., Cambridge, Mass., showing either the correlation function $r(\tau)$ or the output spectrum $\varphi(\omega)$.

As seen in Figs. 5 and 7, a mechanical means for picking out the required narrow zone 19 of the oscillogram so as to permit analysis of the tested material in relatively narrow stripes 20 may include an opaque diaphragm or shield 28 interposed between the photocell 21 and the face of the oscilloscope 6 and having a slit 27, with the photocell 21 being fixedly attached to the diaphragm 28 for movement with the latter, as a unit, in the direction of the arrows 30, within a suitable guiding frame 29, so that the complete oscillogram can be continuously scanned. If desired, the moving slit 27 could be arranged directly on the face of the oscilloscope, similar to the arrangement in a Leica photographic camera, while the photocell is disposed in a cone-shaped enclosure, for example, as disclosed in United States Letters Patent No. 2,603,966, issued July 22, 1952, to H. C. Drake. Further, in the case of a flat screen on the oscilloscope and a photocell which is sensitive only to light along a thin line, the photocell could be moved across the face of the oscilloscope, and the diaphragm 28 with its slit 27 could be eliminated.

An alternative embodiment is shown in Fig. 6.

Here the evaluation devices 23, 24, 25 is connected directly or by the amplifier 22 to the circuit of a known device for ultrasonic testing for defects e.g. according to Fig. 1. In order to obtain and adjust a suitable section 19 of the oscillogram it is in this case necessary to key the receiver consisting of the elements 10, 11, 12 (Fig. 1) i.e. to permit amplification of the signal $y(t)$ in a time section only, which corresponds to the width of the tested range 20 of the material 4 (Fig. 3). This is achieved by connecting an adjustable delaying circuit 26 to an output element—low frequency wide-range amplifier 12—which then amplifies the signal $y(t)$ only during the period of duration of the adjustable delayed pulse. In this case the cathode ray tube 6 may even be dispensed with. For a better evaluation of the quality of the structure it is, however, recommended to retain the cathode ray tube 6 in order to permit the observer to also follow visually the output signal $y(t)$.

It is obvious from the above disclosure that the device according to the invention makes possible a further substantial extension of non-destructive testing for defects by ultrasonic waves even into the range of examining fine structures of materials. Prerequisites for its far reaching use are thus obtained, for example for determining the inner structures of castings, forgings, concrete building elements etc. It extends in this way also the application of ultrasonic testing for defects in metallurgical laboratories and in research work on materials.

I claim:

1. A device for nondestructive ultrasonic testing of material comprising means for emitting ultrasonic oscillations against the material under test with a carrier frequency producing ultrasonic waves in the material having a wave-length of the same order as the dimensions of the crystals of the material and for receiving the ultrasonic oscillations reflected from the material along with clutter due to reflections of the ultrasonic waves by the crystals in the material, operating means for intermittently energizing said means for emitting the ultrasonic oscillations and for receiving the reflected ultrasonic oscillations and clutter so that said ultrasonic oscillations are emitted for a short pulse of an order having a maximum value of one micro-second, means generating control pulses which key said operating means, a cathode ray tube having a screen and first and second pairs of deflection plates, time-base generating means controlled by said control pulses and connected to said first pair of deflection plates, means actuated by the reflected oscillations and clutter and transmitting corresponding electrical pulses to said second pair of deflection plates of the cathode ray tube so that an oscillogram is produced on said screen which is characteristic of the reflected oscillations with the clutter due to reflections of the waves by the crystals in the material, a photocell positioned to be responsive to the light energy from a selected section of said oscillogram corresponding to a zone of the material under test so that the output of said photocell is characteristic of the clutter in said zone, and first, second and third indicating means operated by said output of the photocell for indicating the mean value $<y(t)>$ of said clutter in said zone of the material, for indicating the effective value $<y^2(t)>^{1/2}$ of said clutter, and for selectively indicating the correlation function $r(\tau)$ and the output spectrum $\varphi(\omega)$ of said clutter, respectively.

2. A device as in claim 1; further comprising at least one amplifier interposed between said photocell and said first, second and third indicating means.

3. A device for nondestructive ultrasonic testing of material comprising means for emitting ultrasonic oscillations against the material under test with a carrier frequency producing ultrasonic waves in the material having a wave-length of the same order as the dimensions of the crystals of the material and for receiving the ultrasonic oscillations from the material with clutter due to reflection of said ultrasonic waves by the individual crystals in the material, operating means for intermittently energizing the first mentioned means so that said ultrasonic oscillations are emitted for a short pulse of an order having a maximum value of one microsecond, means for generating control pulses to key said operating means, means responsive to the ultrasonic oscillations and clutter received from the material under test to transmit electrical pulses which are characteristic of said oscillations and clutter, means also actuated by said control pulses for operating the last mentioned means only during a time interval corresponding to a selected zone of the material so that the electrical pulses from said means to transmit electrical pulses are representative of said clutter in said selected zone, and first, second and third indicating means operated by said electrical pulses from said means to transmit electrical pulses for indicating the mean value $<y(t)>$ of said electrical pulses representing the clutter in said selected zone, for indicating the effective value $<y^2(t)>^{1/2}$ of said electrical pulses from said means to transmit electrical pulses, and for selectively indicating the correlation function $r(\tau)$ and the output spectrum $\varphi(\omega)$ of said electrical pulses from said means to transmit electrical pulses.

4. A device for nondestructive ultrasonic testing of material comprising means for emitting ultrasonic pulses against the material under test with a carrier frequency producing ultrasonic waves in the material having a wavelength of the same order as the dimensions of crystals of the material and for receiving ultrasonic pulses returning from the material along with the clutter due to reflections of said ultrasonic waves by the individual crystals constituting the material under test and transforming these return pulses and clutter into electrical pulses, operating means for intermittently energizing said means for emitting ultrasonic pulses so that said ultrasonic pulses are emitted for a short period of an order having a maximum value of one microsecond, means for generating control pulses to key said operating means, amplifying means connected to said receiving and transforming means to transmit said electrical pulses which are characteristic of the clutter due to reflections of said ultrasonic waves by the crystals in the material, adjustable delay means keyed by control pulses from said generator means and operating said amplifying means only during the time interval corresponding to a selected zone of the material so that the electrical pulses from said amplifying means are representative of the clutter in said selected zone only, and first, second and third indicating means operated by said electrical pulses from said amplifying means for indicating the mean value $<y(t)>$ of said electrical pulses representing the clutter in said selected zone, for indicating the effective value $<y^2(t)>^{1/2}$ of said electrical pulses from the amplifying means, and for selectively indicating the correlation function $r(\tau)$ and the output spectrum $\varphi(\omega)$ of said electrical pulses from the amplifying means.

References Cited in the file of this patent

UNITED STATES PATENTS

| 2,507,854 | De Lano | May 16, 1950 |
| 2,603,966 | Drake | July 22, 1952 |

FOREIGN PATENTS

| 1,059,948 | France | Nov. 18, 1953 |

OTHER REFERENCES

Publication, Journal of Applied Physics, October 1948, vol. 19, pp. 901–910, article by W. Roth.